United States Patent [19]
Schwiderski

[11] Patent Number: 5,750,902
[45] Date of Patent: May 12, 1998

[54] MAGNETOINDUCTIVE FLOW METER

[75] Inventor: Hans W. Schwiderski, Hardenberg, Germany

[73] Assignee: Elsag International N.V., Amsterdam, Netherlands

[21] Appl. No.: 794,145

[22] Filed: Feb. 3, 1997

[30]     Foreign Application Priority Data

Feb. 5, 1996 [DE]  Germany .................. 196 04 004.3

[51] Int. Cl.$^6$ .................................................. G02F 1/58
[52] U.S. Cl. ............................. 73/861.12; 73/861.11
[58] Field of Search .......................... 73/861.11, 861.12, 73/861.16

[56]  References Cited

U.S. PATENT DOCUMENTS

| | | | |
|---|---|---|---|
| 3,286,522 | 11/1966 | Cushing | 73/861.11 |
| 3,924,466 | 12/1975 | Medlar. | |
| 4,050,303 | 9/1977 | Hemp et al.. | |
| 4,428,241 | 1/1984 | Davis et al.. | |

*Primary Examiner*—Elizabeth L. Dougherty
*Attorney, Agent, or Firm*—Michael M. Rickin

[57]  ABSTRACT

A magnetoinductive flow meter with a measuring tube, an electromagnet device with at least one electric conductor loop arrangement for generating a magnetic field penetrating the measuring tube at right angles to the longitudinal axis thereof, and at least two measuring electrodes, which are arranged opposite one another at right angles to the longitudinal axis of the measuring tube in such a way that they can be used to tap a measuring voltage induced owing to the flow, proceeding at right angles to the magnetic field, of a liquid flowing through the measuring tube. The electric conductor loop arrangement has an electrically conductive sheet-metal part which is fitted on the inner side or on the outer side of the body of the measuring tube and is provided with at least one cutout as inner boundary of the conductor loop current path running around the cutout in the sheet-metal material. The flow meter has a simpler design of the electromagnet device and permits square-wave magnetic field excitation by means of a comparatively high frequency even in the case of measuring tubes having large nominal diameters (for example DN>300) since the conductor loop arrangement has a low inductance.

21 Claims, 6 Drawing Sheets

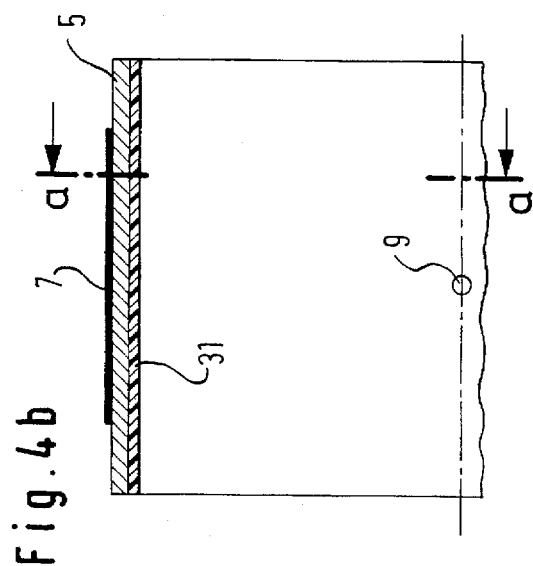
Fig.4a  Fig.4b
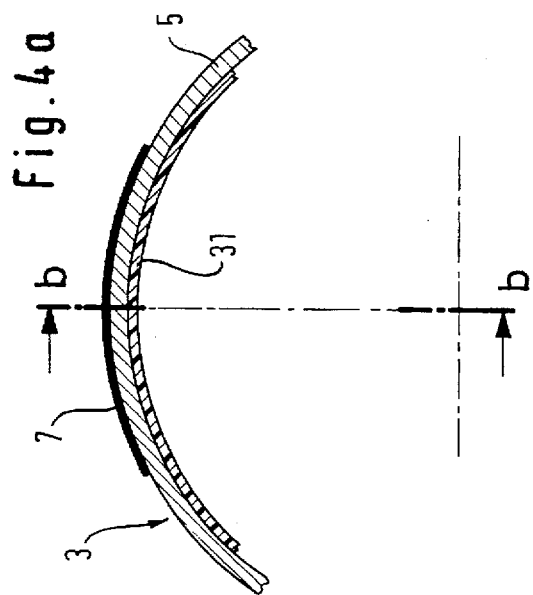 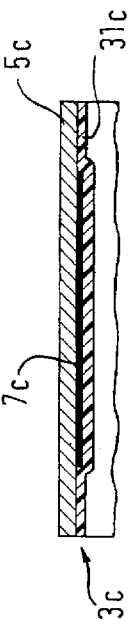 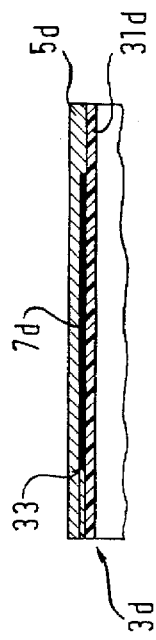 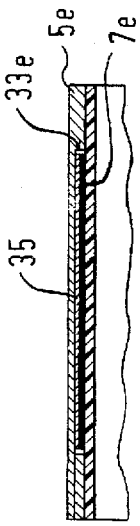
Fig.5  Fig.6  Fig.7

MAGNETOINDUCTIVE FLOW METER

FIELD OF THE INVENTION

The invention relates to a magnetoinductive flow meter and more particularly to the electric conductor loop arrangements used in such flow meters.

DESCRIPTION OF THE PRIOR ART

Magnetoinductive flow meters are known which have a measuring tube, an electromagnet device with an electric conductor loop arrangement for generating a magnetic field penetrating the measuring tube at right angles to the tube longitudinal axis thereof, and at least two measuring electrodes. The measuring electrodes are arranged opposite one another at right angles to the longitudinal axis of the measuring tube in such a way that they can be used to tap a measuring voltage induced owing to the flow, proceeding at right angles to the magnetic field, of a liquid flowing through the measuring tube.

In a magnetoinductive flow meter of the type mentioned at the beginning, use is made of the effect that there is induced in the liquid which flows through the measuring tube at right angles to the magnetic field and has a minimum electric conductivity a voltage which is a function of the flow velocity and can be tapped via the measuring electrodes. The detected measuring voltage is usually evaluated in order to provide flow rate information.

Within the scope of the present application, the term liquid is also intended to include mashes, sludges, pastes and the like.

In the conventional magnetoinductive flow meters, the electromagnet device for generating the magnetic field normally has two or more conductor loop arrangements in the form of wound coils having a large number of turns. These coils are arranged in most instances diametrically opposite to one another on the outer circumference of the measuring tube. However, such an arrangement of the coils on the outer circumference of the measuring tube means that the measuring tube consists of a material which has no magnetic screening effect towards the tube interior. However, use is also made of conventional, magnetizable types of steel, in particular for measuring tubes having relatively large nominal diameters. In the case of such measuring tubes, the electromagnet coils are accommodated either in the tube interior or in recesses in the tube wall in such a way that the magnetic field can penetrate the tube interior.

DE-26 19 870 A1 discloses a magnetoinductive flow meter in which the wound coils are arranged on the inner wall of a measuring tube made from magnetizable steel and are accommodated there in separate coil housings made from nonmagnetizable material. For their part, the coil housings are embedded in a cylindrical insert which bears with its outer circumference against the inner circumference of the steel tube. The cylindrical insert is provided on its inner circumference with a lining which limits the flow cross-section of the measuring tube. The result of embedding the coil formers is that the coil formers do not change the flow behavior of the liquid at the measuring location in a way which coarsely falsifies the measurement. However, the expenditure, that is cost, to reach this end is relatively large in the flow meter according to DE 26 19 870 A1. It should be pointed out, in particular, that the free measuring tube cross-section is reduced by the measures for embedding the coils in a nonmagnetic material to an extent which is by no means negligible.

It has also already become customary when measuring flow rates using magnetoinductive flow meters to use the electromagnet device to generate an alternating magnetic field or a time-dependent magnetic field by appropriate excitation of the coils, in order to suppress disturbances which are superimposed on the measuring voltage, or to eliminate them at the evaluation end and avoid measuring errors. A known possibility for generating a time-dependent magnetic field consists in exciting the coils by means of square-wave signals of specific frequency.

In the case of strong electromagnets having a large number of coil turns, such as are used for measuring tubes having large nominal diameters, for example DN>300, the problem arises, however, that because of the correspondingly high inductances of the coil windings the time constants relating to the production of a magnetic field of sufficient strength for measurement are so large that the flow rate measuring velocity is greatly reduced and the advantages of the time-dependent excitation of the magnetic field can be exploited only to a limited extent.

U.S. Pat. No. 4,050,303 discloses a magnetoinductive flow meter in which a conductor loop arrangement of the electromagnet device is implemented by thin copper conductor tracks which have been produced on an insulating carrier by means of a method for printing conductor tracks. The conductor loop pattern of this printed circuit is extraordinarily complex and requires a multiplicity of current connecting points for the power supply. The aim is to reduce the dependence of the sensitivity of the flow meter on the velocity profile of the flowing liquid. In the case of the flow meter according to U.S. Pat. No. 4,050,303, the printed conductor loop circuit is arranged on the inner circumference of a carrier tube surrounding the actual measuring tube at a radial spacing.

Irrespective of the fact that the production of a complex conductor track pattern, and the measures for wiring the numerous current connecting points are expensive, the conductor loop arrangement according to U.S. Pat. No. 4,050,303 would not be suitable for generating the strong magnetic fields required in measuring tubes having a large nominal diameter, since the high currents required for this purpose would overtax the thin conductor tracks.

U.S. Pat. No. 3,924,466 discloses a further example of a magnetoinductive flow meter, in which the conductor loop arrangement of the electromagnet device is implemented as a printed circuit by means of thin conductor tracks which are produced on an insulating, flexible carrier using a method for printing conductor tracks. The conductor tracks form a pattern of electrically interconnected conductor strips, only two current connecting points being required to supply power to a relevant conductor strip arrangement. In the magnetoinductive flow meter according to U.S. Pat. No. 3,924,466, the conductor loop arrangement designed as a printed circuit is arranged between the inner wall of the body of the measuring tube and an electrically insulating tube lining with the result that the body of the measuring tube can, if it consists of a magnetizable material, perform the magnetic return between two relevant conductor loop arrangements which are arranged opposite one another on the inner circumference of the body of the measuring tube.

In an exemplary embodiment of the magnetoinductive flow meter according to U.S. Pat. No. 3,924,466, which has a nonmagnetizable body of the measuring tube, the conductor loop arrangement, implemented in the form of a printed circuit, is provided on the outer circumference of the body of the measuring tube and surrounded by a laminated coating, made from magnetizable material, which performs the magnetic return by largely preventing eddy currents.

JP 59-34118 (A) discloses a magnetoinductive flow meter in which for the purpose of forming the conductor loop arrangement a plurality of printed circuits of the type mentioned with reference to U.S. Pat. No. 3,924,466 are stratified one above another. The printed circuits comprise an electrically insulating, foliate carrier material on which a spirally running conductor track is applied. The laminated printed circuits are interconnected in parallel by appropriate interconnections.

JP 62-255820 (A) discloses a magnetoinductive flow meter in which the electric conductor loop arrangement comprises wound coils which are penetrated by a flat strip made from ferromagnetic material. This flat metal strip is wound around the body of the measuring tube in such a way that the coils are positioned at diametrically opposite ends of the body of the measuring tube. The end sections and a section of the flat strip, which acts as coil core and is bent around the body of the measuring tube to form a closed loop are fastened to fastening elements. The fastening elements, which resemble pole shoes, are made from ferromagnetic material and are fitted on the outer circumference at diametrically opposite ends of the body of the measuring tube, and keep magnetic loops formed from the flat strip at a radial spacing from the outer circumference of the body of the measuring tube.

JP 1-178822 (A) discloses a magnetoinductive flow meter in which the conductor loop arrangement comprises a substrate and a conductor track pattern, produced thereon by an etching process, in the form of a spiral conductor track.

EP 0 682 233 A2 discloses a tube lining element which can be inserted into the measuring tube of a magnetoinductive flow meter and has embedded in it flat coils which form relevant conductor loop arrangements.

German utility model No. 19 24 152 discloses a magnetoinductive flow meter in which bar-shaped conductors are formed into a basket-like covering of the body of the measuring tube, in order to form a conductor loop arrangement of a relevant electromagnet device. The conductor loop arrangement fitted outside on the measuring tube is surrounded by a protective sheath of concrete, plastic or the like. To generate a magnetic field, the conductor loop arrangement is fed from an alternating current source outputting low voltage.

Furthermore, reference is made concerning the general prior art to U.S. Pat. No. 4,428,241 and JP 5-107091 (A), which concern magnetoinductive flow meters which make use of planar conducting structures in the form of printed circuits in order to suppress signal disturbances or to supply coils of the electromagnet arrangement with current.

Therefore, it is desirable to provide a magnetoinductive flow meter of the type mentioned at the beginning which has a conductor loop arrangement which can be produced using simple means and can be fitted without taking up appreciable space on the inner circumference or—in the case of a nonmagnetizable measuring tube—on the outer circumference of the measuring tube. It is further desirable that the conductor loop arrangement be used to generate strong magnetic fields required in the case of measuring tubes having a large nominal diameter, without reducing to an unacceptable extent the measuring velocity of the flow meter in the case of square-wave excitation of the magnetic field.

SUMMARY OF THE INVENTION

A magnetoinductive flow meter which has a measuring tube having a body. The flow meter also an electromagnet device with at least one electric conductor loop arrangement for generating a magnetic field penetrating the measuring tube at right angles to the tube's longitudinal axis. The flow meter further has at least two measuring electrodes, which are arranged opposite one another at right angles to the measuring tube's longitudinal axis in such a way that they can be used to tap a measuring voltage induced owing to the flow, proceeding at right angles to the magnetic field, of a liquid flowing through the measuring tube.

The electric conductor loop arrangement has an electrically conductive sheet-metal part that provides a loop current path. The sheet-metal part is arranged on the inner side or on the outer side of the measuring tube body. The sheet-metal part has at least one cutout that is perpendicular to the longitudinal axis of the measuring tube. The cutout acts as the inner boundary of the sheet-metal part loop current path and divides the loop current path into two contrarotating current path parts which are also perpendicular to the measuring tube longitudinal axis.

The present invention is also embodied as a magnetoinductive flowmeter as described above wherein the sheet-metal part is designed as a coherent integral sheet. The present invention is further embodied as a magnetoinductive flowmeter as described above that also has a supply voltage source for the electric loop conductor arrangement. The supply voltage source has a transformer the core of which penetrates the cutout. As a result thereof, the conductor loop current path that runs around the cutout forms the secondary circuit of the transformer.

The present invention is also further embodied as described above where the sheet-metal part is arranged on the inner circumference of the measuring tube and the measuring tube body is made from a magnetizable material. The present invention is further also embodied as described above where the sheet-metal part is arranged in a depression in the measuring tube body. The present invention is further embodied as described above wherein the measuring tube body is lined on its inner circumference with a nonmagnetizable material which also covers the sheet-metal part towards the tube interior.

DESCRIPTION OF THE DRAWING

FIG. 4a shows in a cross-sectional representation corresponding to the sectional plane a—a in FIG. 4b a broken-out section of a measuring tube with an external conductor loop arrangement made from a sheet-metal part.

FIG. 4b shows a longitudinal section corresponding to the sectional plane b—b in FIG. 4a through the measuring tube in accordance with FIG. 4a, it being the case that in FIG. 4b, as well, only a section of the measuring tube represented as broken away is shown.

FIGS. 5–7 show further exemplary embodiments of a measuring tube of a flow meter according to the invention in a view corresponding to FIG. 4b.

DESCRIPTION OF THE PREFERRED EMBODIMENT(S)

Figure 1:
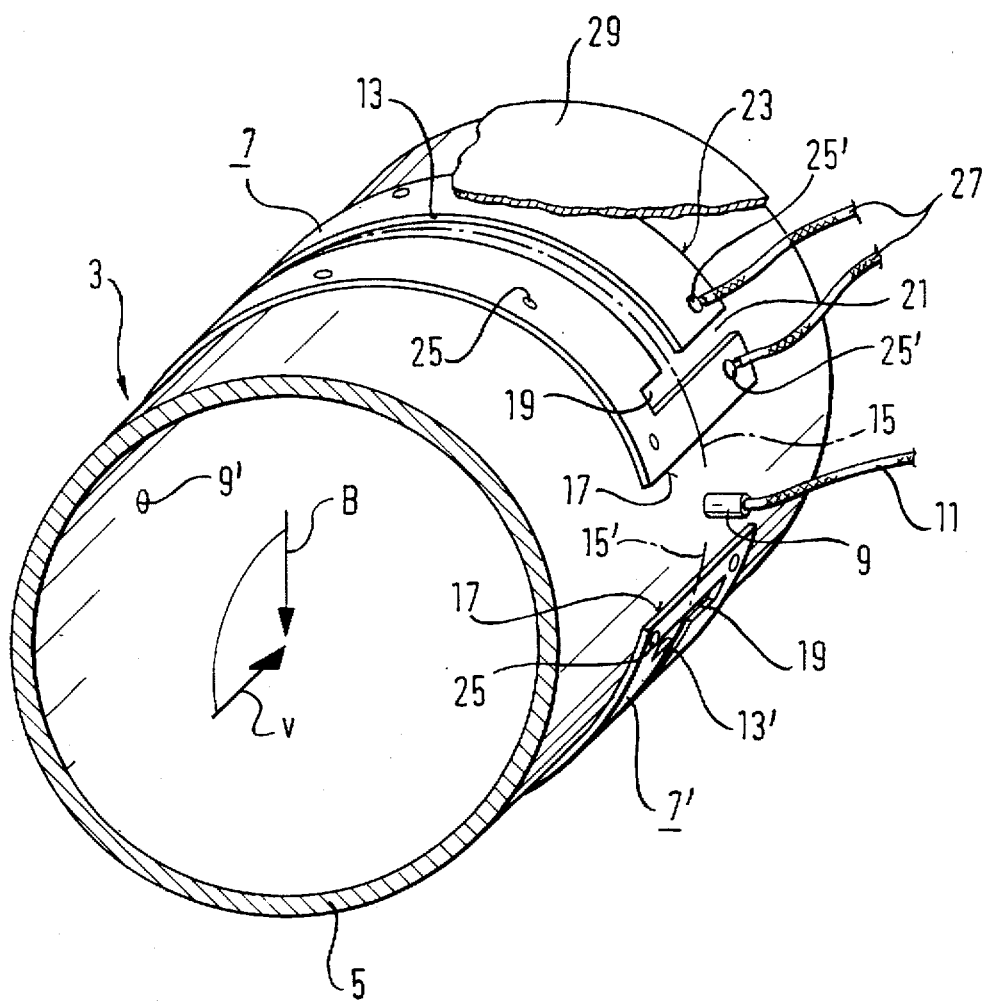
FIG. 1 shows, in a simplified perspective representation, a section of a measuring tube having two conductor loop arrangements made from a sheet-metal part lying opposite one another on the measuring tube.

FIG. 1 shows a section of a measuring tube 3 of a magnetoinductive flow meter according to the invention. In the exemplary embodiment shown in FIG. 1, the tube body 5 through which liquid flows consists of a nonmagnetizable material and has on its outer circumference two conductor loop arrangements 7, 7'. The arrangements 7, 7' are made from sheet-metal parts, bear in a planar fashion and during the measurement operation generate a magnetic field (magnetic flux density B) penetrating the tube body 5 at right angles to the flow direction v of the liquid. The liquid is electrically conductive at least to a slight degree, as indicated diagrammatically by the arrows v, B for an instantaneous photograph.

A measuring voltage induced in the liquid owing to the flow proceeding at right angles to the magnetic field is tapped via a pair 9, 9' of measuring electrodes and evaluated in an electronic evaluation device (not shown) as a function of the strength of the B field, the tube cross-section and any possible further variables or evaluation and correction parameters, in order to provide information on the quantity of liquid flowing through the tube body 5 per unit of time. In FIG. 1, 11 denotes a line leading from the measuring electrode 9 to the evaluation device (notshown). A corresponding line is also connected to the electrode 9'.

The special feature of the measuring tube 3 resides in the conductor loop arrangements 7 and 7'. These are in each case an integrally coherent sheet-metal blank having a rectangular contour and a slotted cutout 13, 13' which extends along the longitudinal centerline 15 or 15' of the relevant sheet-metal part 7 or 7', but does not reach the narrow edges 17 of the relevant sheet-metal part 7 or 7'.

In the case of the example, the cutout 13 or 13' has in each case at its longitudinal ends a transverse section 19 (compare also FIG. 2b), one of the transverse sections 19 being extended by an interruption section 21 to the side edge 23 of the sheet-metal part 7 or 7', in order to provide an interruption in the conductor loop current path formed by the sheet-metal part 7 or 7' and leading around the cutout 13. Ignoring the interruption section 21 of the cutout 13, the conductor loop arrangement 7 or 7' made from a sheet-metal part is symmetrically designed relative to the longitudinal centerline 15. In the mounting arrangement on the tube body 5, the conductor loop arrangements 7 and 7' are diametrically opposite one another, the longitudinal sections of the cutouts 13, 13' lying in a plane containing electrodes 9, 9' and orthogonal to the longitudinal axis of the tube body 5.

In FIG. 1, 25 denotes the fastening points at which the sheet-metal parts 7 or 7' are attached to the tube body 5 with screws. The two fastenings 25' lying opposite one another beyond the interruption section 21 serve, in addition, to make the terminal connection on the connecting lines 27 to the power source (not shown). Because of this geometry, when an appropriate voltage is applied by lines 27 a flow of current is caused around the cutout 13, in order to generate the magnetic field. Each of the sheet-metal parts 7, 7' therefore forms in the case of the example a single-turn conductor loop in which very high current densities can be produced in order to generate a correspondingly strong magnetic field.

The sheet-metal parts 7 and 7' preferably consist of copper, which is a very good conductor of electricity. The sheet-metal thickness can be, for example, about 1.5 mm. Dimensions of the side edges of the sheet-metal parts 7 or 7', along the line 15 and at right angles thereto can be of the order of magnitude of several decimeters, independently of the dimensioning of the tube body. The respective conductor loop therefore has a comparatively large current-carrying cross-section and, at the same time, large heat-dissipating surfaces.

This concept renders it possible to use very low voltages of, for example, 20–40 mV to cause strong conductor loop currents of, for example, 200 A to flow and yet to master the thermal problems. Since the conductor loop 7 or 7' has a low inductance by comparison with the conventional wound coil, the high currents can be used to build up a correspondingly strong magnetic field with substantially smaller time constants. This means that in the case of flow measurement using, for example, square-wave excitation of the conductor loops the repetition rate can be substantially higher for the excitation of the conductor loop 7 or 7' than in the case of conventional wound-coil electromagnets. The flow measurement time intervals are correspondingly shorter.

The comparatively smaller inductance of the conductor loop arrangements 7 or 7' made from a sheet-metal part permits quick square-wave magnetic field excitation with a sufficiently high magnetic flux density B to be applied even in the case of measuring tubes having large nominal diameters of, for example, DN>300, and thus permits the metrological advantages of square-wave excitation to be utilized in cases of installations of large dimension.

In FIG. 1, 29 indicates an electrically insulating coating (shown broken). It is possible to provide between the insulating coating 29 and the sheet-metal parts 7 or 7', or outside on the coating 29 a magnetic steel sheet (not shown) which undertakes in the manner of a yoke the magnetic return between the sheet-metal parts 7 and 7'.

It remains to be pointed out that because of the low voltages for generating the magnetic field it is relatively easy to master insulation problems. Furthermore, in this connection there is the metrological advantage that the difference between the comparatively low conductor loop voltage and the measuring voltage at the electrodes 9, 9' is substantially smaller than in the case of conventional magnetoinductive flow meters having wound coils. The design outlay can be reduced substantially in the case of devices having a capacitive measuring voltage tap.

FIGS. 2a–2d show the blanks of four differently configured conductor loop arrangements made from sheet-metal parts. The conductor loop arrangement 7 in FIG. 2a has a rectangular contour with a centrally arranged cutout 13 which—ignoring its interruption section 21—is of rectangular design. The power connecting points are denoted as 25'.

Figure 2A:
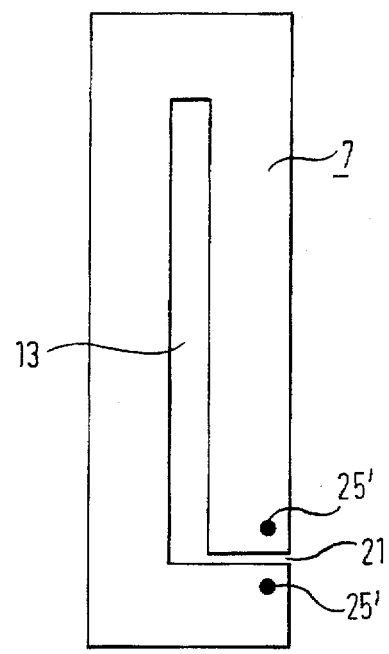
FIGS. 2a–2d show examples for the configuration of the blank of integrally coherent conductor loop arrangements made, in accordance with the invention, from a sheet-metal part.
Figure 2B:
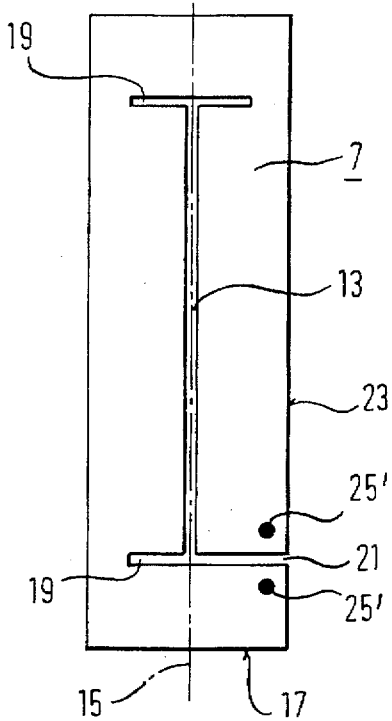

The blank in accordance with FIG. 2b corresponds to the blank of the sheet-metal parts 7 or 7' in FIG. 1, and so reference may be made with regard to the details to the description relating to FIG. 1.

Figure 2C:
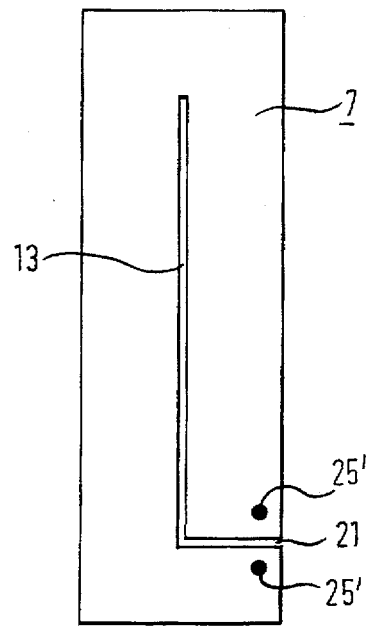

FIG. 2c shows a blank which essentially corresponds to that in FIG. 2a, it being the case, however, that the cutout 13 is of narrower design in FIG. 2c.

Figure 2D:
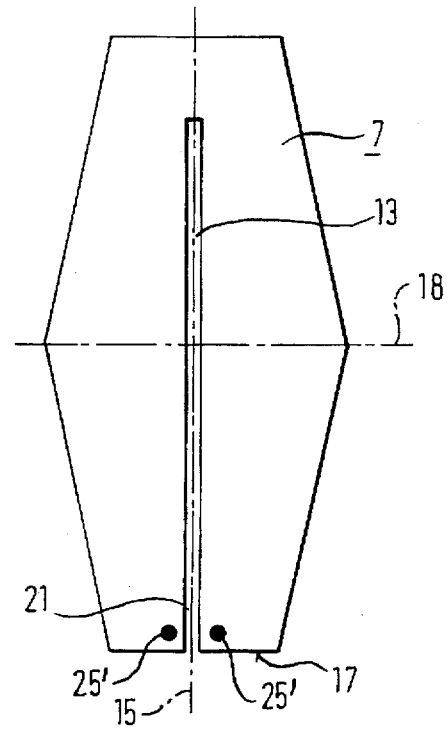

The conductor loop arrangement 7 according to FIG. 2d is of completely symmetrical design with regard to the longitudinal centerline 15 and differs from the conductor loop arrangements discussed so far by the fact that, in particular, its blank is not rectangular. Starting from the lower edge 17, the blank according to FIG. 2d becomes wider with increasing distance from the lower edge 17 as far as the centerline 18, when it then tapers again towards the upper edge. The cutout 13 located on the longitudinal centerline 15 is open towards the lower edge 17, the two power connecting points 25' being situated in the vicinity of the lower edge 17 of the sheet-metal part 7 on both sides of the slotted cutout 13.

FIGS. 2a–2d respectively show integrally coherent sheet-metal parts 7 having a geometry which can be produced in a very simple way. The blanks shown are only examples. Depending on the requirements of the magnetic field to be generated, a person skilled in the art can also choose other contours and forms of cutouts, in order to provide specific current density distributions in the conductor loop arrangement, it being possible to influence the magnetic field distribution in the tube interior by the current density distribution in the conductor loop 7. Normally, the aim is to implement a magnetic field distribution over the cross-section of the measuring tube which is optimized to the effect that, to the extent that the same quantities of liquid flow through them, all the planar elements of the tube cross-section are evaluated virtually identically with reference to the measuring voltage tap at the measuring electrodes.

Figure 3A:
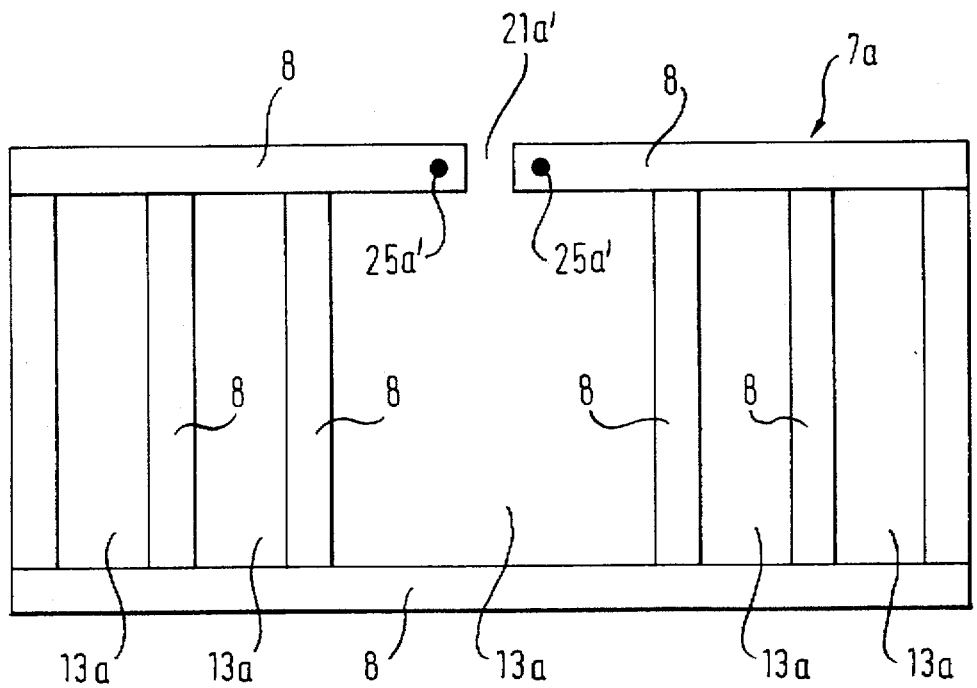
FIGS. 3a–3b show examples of two conductor loop arrangements made from a sheet-metal part, which have been combined from different sheet-metal sections or sheet-metal strips, in the unbent state.

FIG. 3a shows a conductor loop arrangement 7a made from a sheet-metal part for a magnetoinductive flow meter according to the invention, which is formed from individual sheet-metal strips 8 firmly joined to one another. Elements in FIG. 3a which correspond in terms of effect to elements of the arrangement in FIG. 1 are provided with correspondingly identical reference symbols, with the result that reference may be made to the description relating to FIG. 1. A special feature present in addition in the case of the embodiment according to FIG. 3a is that a plurality of cutouts 13a are formed, it being the case, however, that only two power connecting points 25a' are required to operate the conductor loop arrangement according to FIG. 3a.

Figure 3B:
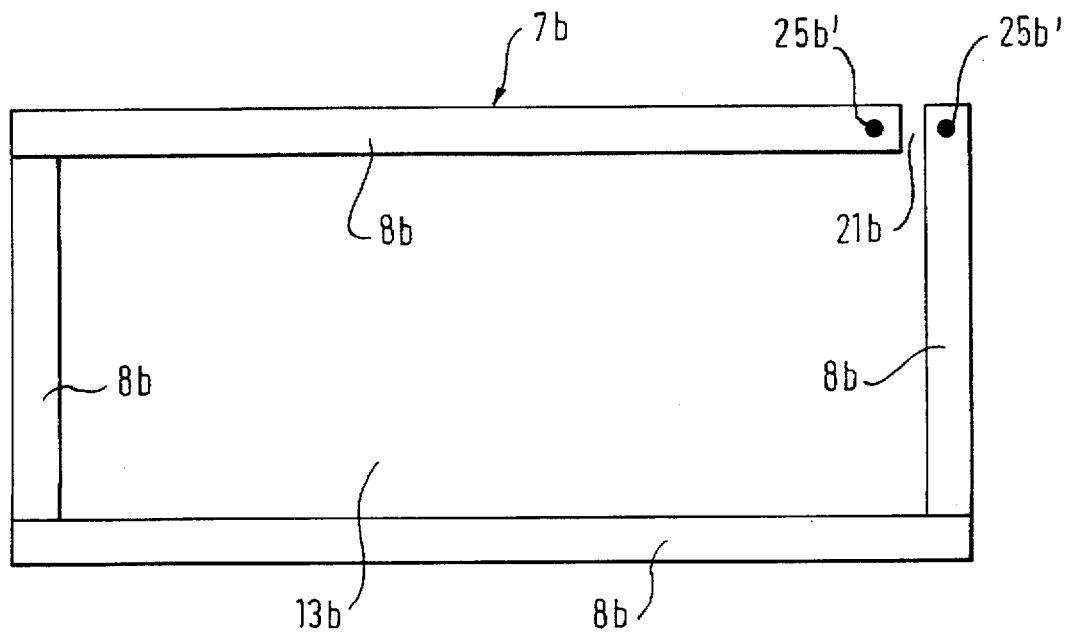

FIG. 3b shows a further exemplary embodiment of a conductor loop arrangement 7b made from a sheet-metal part and comprising sheet-metal strips 8b firmly joined to one another, it being the case, however, that only one cutout 13b is provided.

FIG. 4a shows a segment, represented in a broken fashion, of a measuring tube 3 of a magnetoinductive flow meter according to the invention, in a cross-sectional representation.

FIG. 4b shows a longitudinal section through the measuring tube according to FIG. 4a. FIG. 4b, likewise showing only a segment, represented as broken out, of the measuring tube 3.

The design of the measuring tube according to FIGS. 4a and 4b essentially corresponds to the design according to FIG. 1. Arranged opposite one another beyond the diameter of the tube body 5 on the outer circumference of the tube body 5, which is produced from nonmagnetizable material, are two conductor loop arrangements 7 which are made from sheet-metal parts and of which only one is shown in FIGS. 4a and 4b. In FIGS. 4a and 4b, 31 denotes an inner tube lining made from nonmagnetic material. Such an inner lining is frequently used in order to insulate the measuring tube, to the extent it is electrically conductive, electrically towards the tube interior and, furthermore, to provide a protective coating which is chemically resistant to the liquid.

FIGS. 5–7 respectively show a part, represented as broken away, of further measuring tubes for magnetoinductive flow meters according to the invention in a longitudinal section resembling FIG. 4b.

Elements in FIGS. 5–7 which correspond in terms of effect to elements in FIG. 1 or FIGS. 4a and 4b, are marked with correspondingly identical reference numerals followed by lower case letters.

In the exemplary embodiment according to FIG. 5, the tube body 5c consists of a magnetizable material, for example of a conventional steel. The conductor loop arrangements 7c made from sheet-metal parts, of which only one is respectively shown in FIGS. 5–7, are located on the inner circumference of the tube body 5c and are covered towards the tube interior by the lining material 31c.

A particular advantage of the coating structure according to FIG. 5 is that the tube body 5c can perform the function of the magnetic return.

The arrangement in accordance with FIG. 6 differs from that according to FIG. 5 only in that the conductor loop arrangement 7d made from a sheet-metal part is arranged in a recess 33 on the inner circumference of the tube body 5d.

In the case of the measuring tube according to FIG. 7, the tube body 5e consists of a nonmagnetic material.

Arranged in a recess 33e on the inner circumference of the tube body 5e are the conductor loop arrangements 7e made from sheet-metal parts and a metal sheet 35, which effects magnetic return and extends over the radially outwardly situated flat sides of the conductor loop arrangements 7e. An advantage of the design according to FIG. 7 consists in that it is possible effectively to prevent the production of eddy currents in the tube body 5e on the basis of the magnetic return by the magnetic steel sheet 35. The magnetic steel sheet 35 can alternatively also be provided on the outer circumference of the curable body 5e.

Figure 8A:
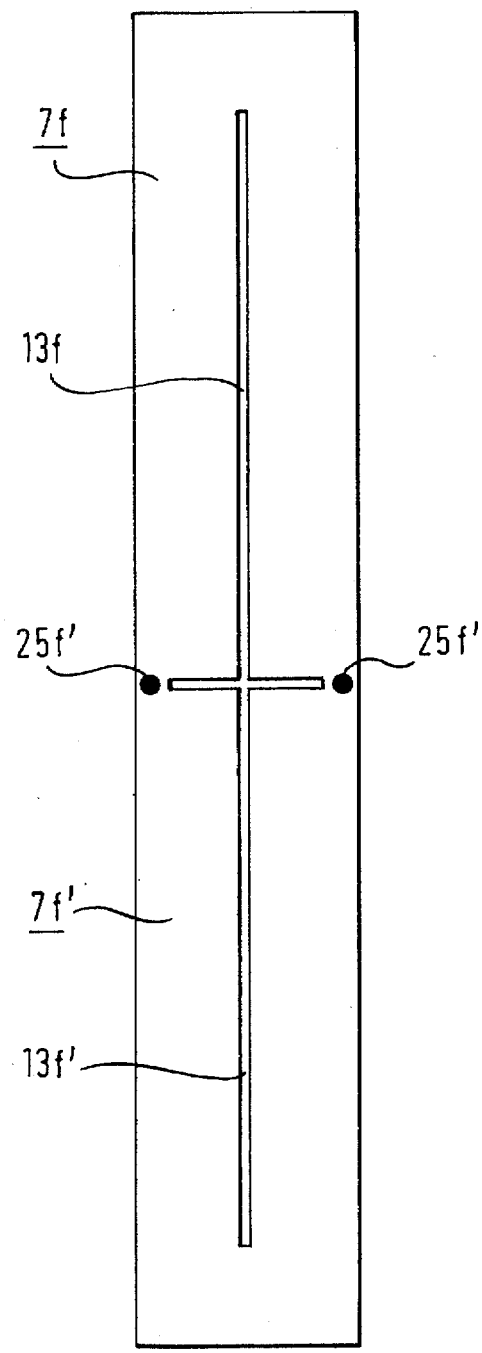
FIGS. 8a–8b show blanks of pairs of conductor loop arrangements which are made from sheet-metal parts and in each case comprise an integrally coherent sheet-metal part.

FIG. 8a shows the unbent blank of an integrally coherent sheet-metal part having two conductor loop arrangements 7f and 7f', which in the bent mounting arrangement are opposite one another on the measuring tube in such a way that the desired magnetic field can be generated at right angles to the direction of flow of the liquid. A particular advantage of the pair 7f, 7f' of conductor loops shown in FIG. 8a made from a single sheet-metal part is that only two power connecting points 25f are required for the common power supply of both conductor loops 7f, 7f'. Moreover, the integral arrangement according to FIG. 8a has advantages in terms of production and assembly and can, furthermore, fulfill a mechanically stiffening function, for example for a tube body made from plastic.

Figure 8B:
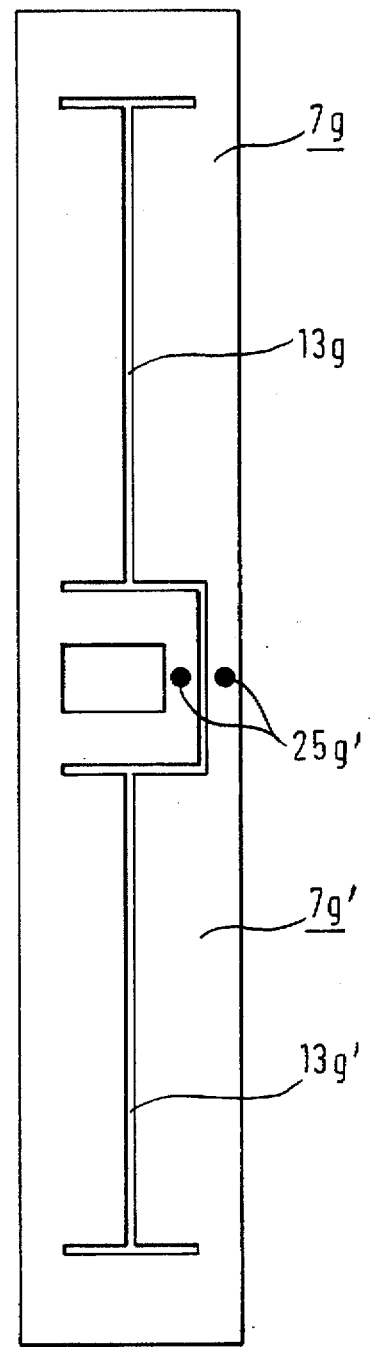

A corresponding statement holds for the blank according to FIG. 8b, which likewise forms a pair 7g, 7g' of conductor loops. The sheet-metal part according to FIG. 8b differs from the sheet-metal part according to FIG. 8a only in the geometry of the cutout 13g and the position of the power connecting points 25g'. Of course, the inventive idea, expressed by the exemplary embodiments in FIGS. 8a and 8b, of implementing a pair of conductor loops by means of an integrally coherent sheet-metal part can also be realized by means of other contour geometries and configurations of the cutout.

Figure 9:
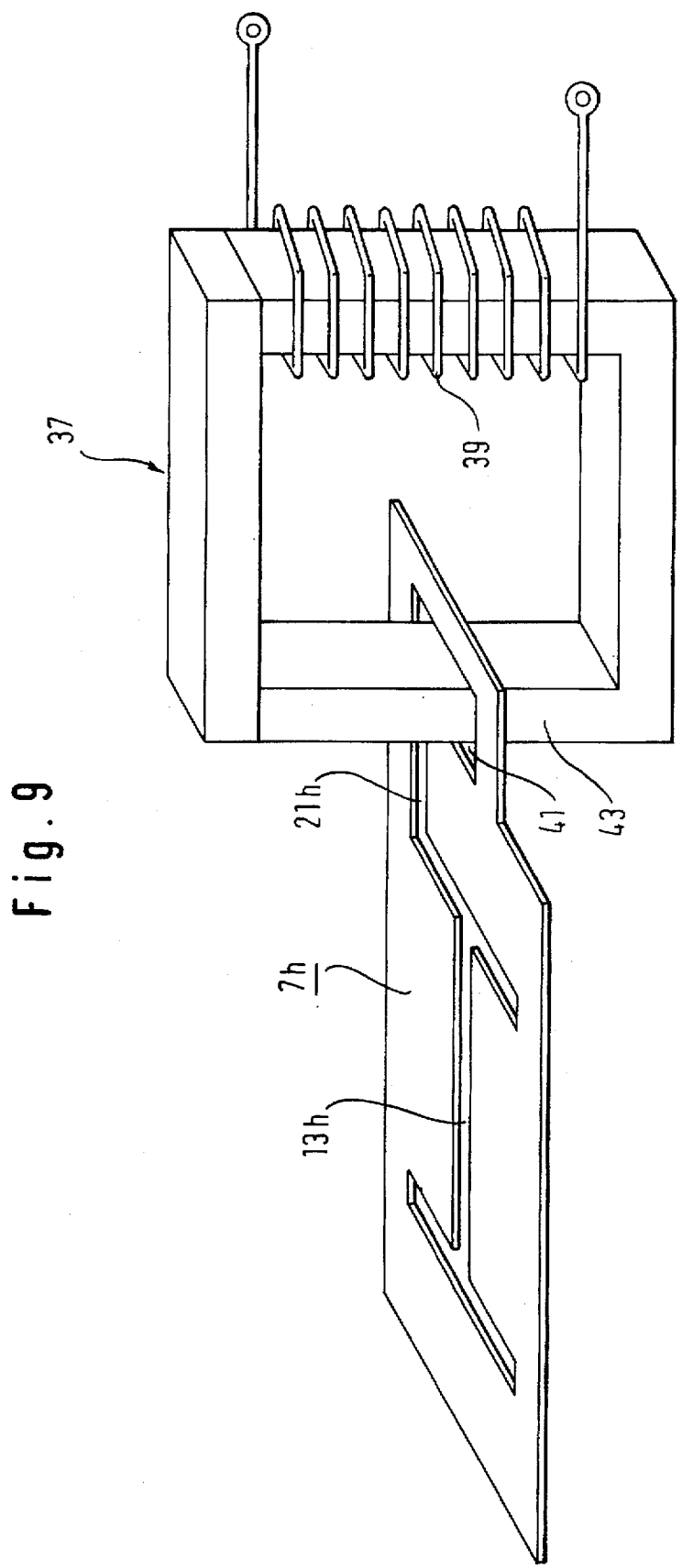
FIG. 9 shows in a simplified representation a conductor loop arrangement made from a sheet-metal part as secondary circuit of a transformer.

FIG. 9 shows a conductor loop arrangement 7h made from a sheet-metal part for a flow meter according to the invention, which arrangement is to be arranged on a measuring tube and is designed as secondary circuit of a transformer 37 whose primary circuit comprises a wound coil 39. The transformer 37 is dimensioned such that the high currents required to generate the magnetic field in the relevant tube body are induced in the conductor loop arrangement 7h made from a sheet-metal part. As is to be seen from FIG. 9, the cutout 13h has a secondary section 41 which is penetrated by a limb 43 of the transformer core.

In a solution according to FIG. 9, separate power connecting points for the conductor loop arrangement 7h are therefore eliminated.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A magnetoinductive flow meter comprising:
   a measuring tube having a body;
   an electromagnet device with at least one electric conductor loop arrangement for generating a magnetic field penetrating said measuring tube at right angles to the longitudinal axis thereof; and
   at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;
   said electric conductor loop arrangement comprising an electrically conductive sheet-metal part for providing a loop current path said sheet-metal part arranged on the inner side or on the outer side of said measuring tube body and having at least one cutout which is perpendicular to the longitudinal axis of said measuring tube, said cutout acting as inner boundary of said sheet-metal part loop current path and dividing said sheet-metal part loop current path into two contrarotating current path parts which are perpendicular to said measuring tube longitudinal axis.

2. The magnetoinductive flow meter according to claim 1, wherein said sheet-metal part is designed as a coherent integral sheet.

3. The magnetoinductive flow meter according to claim 2, wherein said sheet-metal part consists of aluminum, copper, an aluminum alloy or a copper alloy.

4. The magnetoinductive flow meter according to claim 2 wherein said sheet-metal part has a sheet thickness in the range of 0.5 mm to 3.5 mm, in particular in the range of 0.5 mm to 2 mm.

5. The magnetoinductive flow meter according to claim 2 wherein said cutout is a punched hole.

6. The magnetoinductive flow meter according to claim 2, wherein the contour of said sheet-metal part is symmetrical relative to a longitudinal centerline on said sheet-metal part, which centerline extends in a plane lying orthogonal to said measuring tube longitudinal axis, and in that said cutout has a section extending along said longitudinal centerline and symmetrically relative to said longitudinal centerline.

7. The magnetoinductive flow meter according to claim 6, wherein said sheet-metal part has an elongated blank with, in particular, a rectangular contour, and in that said cutout section which is symmetrical relative to said longitudinal centerline is a slot having essentially straight edges.

8. The magnetoinductive flow meter according claim 2, wherein said cutout has an interruption section which is open towards an edge region of said sheet-metal part and interrupts the conductor loop formed by said sheet-metal part and running around said cutout, and in that said sheet-metal part is connected at neighboring points on both sides of this interruption to a supply voltage source.

9. The magnetoinductive flow meter according to claim 2, wherein said sheet-metal part is bent essentially in accordance with the peripheral curvature of said body of said measuring tube and bears closely with a flat side against said body of said measuring tube.

10. The magnetoinductive flow meter according to claim 1 further comprising a supply voltage source for said electric conductor loop arrangement, said supply voltage source comprising a transformer, and wherein said cutout is penetrated by the core of said transformer with the result that the conductor loop current path running around said cutout forms a secondary circuit of said transformer.

11. The magnetoinductive flow meter according to claim 1, wherein said measuring tube body is made from a magnetizable material, in particular, steel or cast iron, and said sheet-metal part is arranged on the inner circumference of said body of said measuring tube.

12. The magnetoinductive flow meter according to claim 1, characterized in that said sheet-metal part is arranged in a depression in said body of said measuring tube.

13. The magnetoinductive flow meter according to claim 1, wherein said body of said measuring tube is lined on its inner circumference with a nonmagnetizable material which also covers said sheet-metal part towards the tube interior.

14. The magnetoinductive flow meter according to claim 1, wherein said measuring tube body is made from a nonmagnetizable material, and said sheet-metal part is arranged on the outer circumference or on the inner circumference of said body of said measuring tube.

15. The magnetoinductive flow meter according to claim 10, wherein said electromagnet device has two conductor loop arrangements which are arranged opposite one another on said measuring tube at right angles to said longitudinal axis of said measuring tube.

16. The magnetoinductive flow meter according to claim 15, wherein said two conductor loop arrangements comprise a coherent integral sheet and are connected to said supply voltage source via two terminals common to both of said two conductor loop arrangements.

17. A magnetoinductive flow meter comprising:
   a measuring tube having a body;
   an electromagnet device with at least one electric conductor loop arrangement for generating a magnetic field penetrating said measuring tube at right angles to the longitudinal axis thereof; and
   at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;
   said electric conductor loop arrangement comprising an electrically conductive sheet-metal part designed as a coherent integral sheet, said sheet-metal part arranged on the inner side or on the outer side of said measuring tube body and is provided with at least one cutout as inner boundary of a conductor loop current path running around said cutout in said sheet-metal material.

18. A magnetoinductive flow meter comprising:
   a measuring tube having a body;
   an electromagnet device with at least one electric conductor loop arrangement for generating a magnetic field penetrating said measuring tube at right angles to the longitudinal axis thereof;

at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;

said electric conductor loop arrangement comprising an electrically conductive sheet-metal part which is arranged on the inner side or on the outer side of said measuring tube body and is provided with at least one cutout as inner boundary of a conductor loop current path running around said cutout in said sheet-metal material; and a supply voltage source for said electric conductor loop arrangement, said supply voltage source comprising a transformer, and wherein said cutout is penetrated by the core of said transformer with the result that the conductor loop current path running around said cutout forms a secondary circuit of said transformer.

19. A magnetoinductive flow meter comprising:

a measuring tube having a body, said body made from a magnetizable material;

an electromagnet device with at least one electric conductor loop arrangement for generating a magnetic field penetrating said measuring tube at right angles to the longitudinal axis thereof; and at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;

said electric conductor loop arrangement comprising an electrically conductive sheet-metal part which is arranged on the outer circumference of said measuring tube body and is provided with at least one cutout as inner boundary of a conductor loop current path running around said cutout in said sheet-metal material.

20. A magnetoinductive flow meter comprising:

a measuring tube having a body;

an electromagnet device with at least one electric conductor loop arrangement for generating a magnetic field penetrating said measuring tube at right angles to the longitudinal axis thereof; and at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;

said electric conductor loop arrangement comprising an electrically conductive sheet-metal part which is arranged in a depression in measuring tube body and is provided with at least one cutout as inner boundary of a conductor loop current path running around said cutout in said sheet-metal material.

21. A magnetoinductive flow meter comprising:

a measuring tube having a body, said body lined on its inner circumference with a nonmagnetizable material;

an electromagnet device with at least one electric conductor loop arrangement for generating a magnetic field penetrating said measuring tube at right angles to the longitudinal axis thereof; and at least two measuring electrodes, which are arranged opposite one another at right angles to the longitudinal axis of said measuring tube in such a way that they can be used to tap a measuring voltage induced owing to the flow, proceeding at right angles to the magnetic field, of a liquid flowing through said measuring tube;

said electric conductor loop arrangement comprising an electrically conductive sheet-metal part which is arranged on the inner side or on the outer side of said measuring tube body and is provided with at least one cutout as inner boundary of a conductor loop current path running around said cutout in said sheet-metal material, said nonmagnetizable material lining said sheet-metal body inner circumference covering said sheet-metal part towards the interior of said measuring tube.

* * * * *